UNITED STATES PATENT OFFICE.

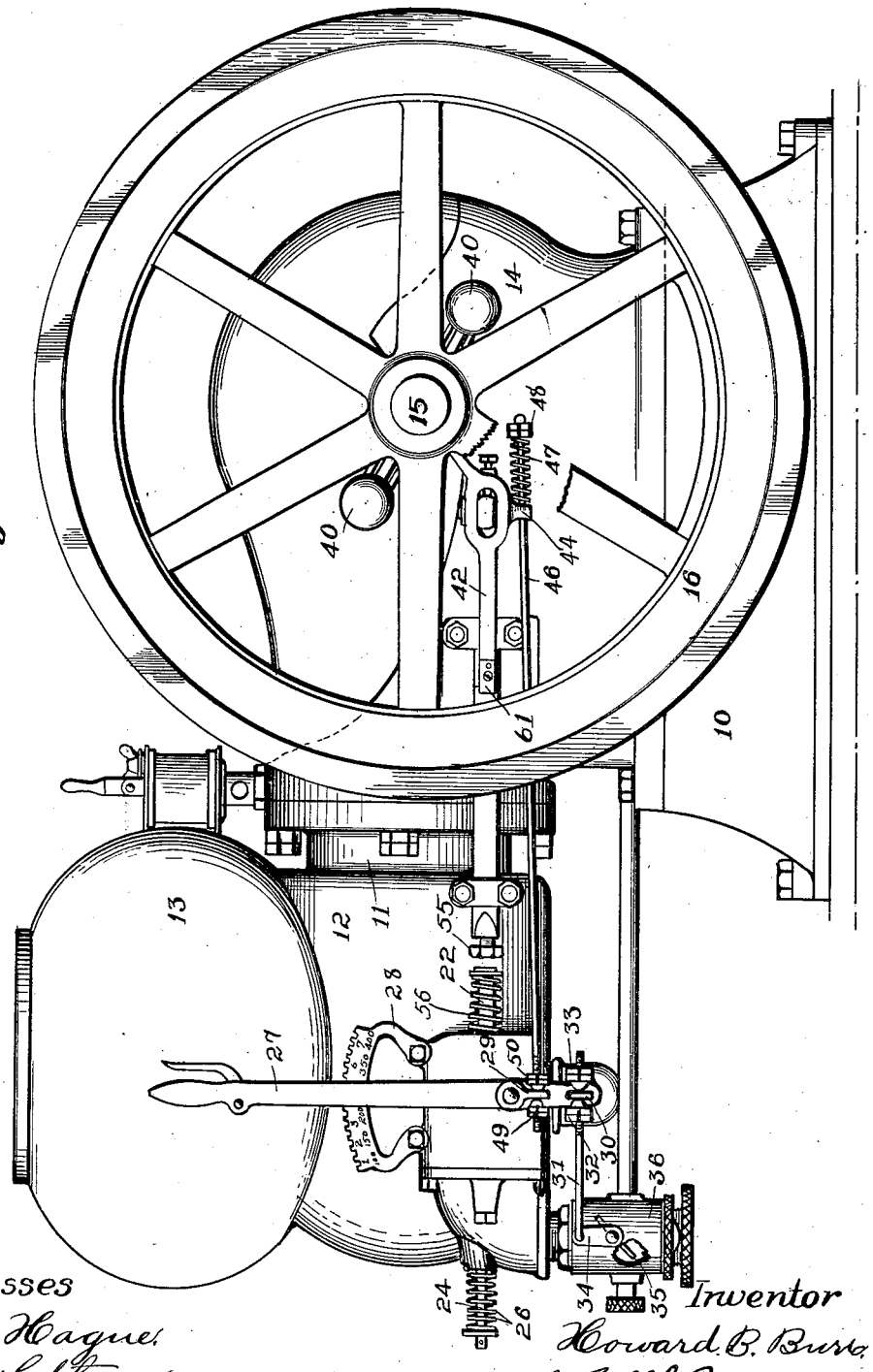

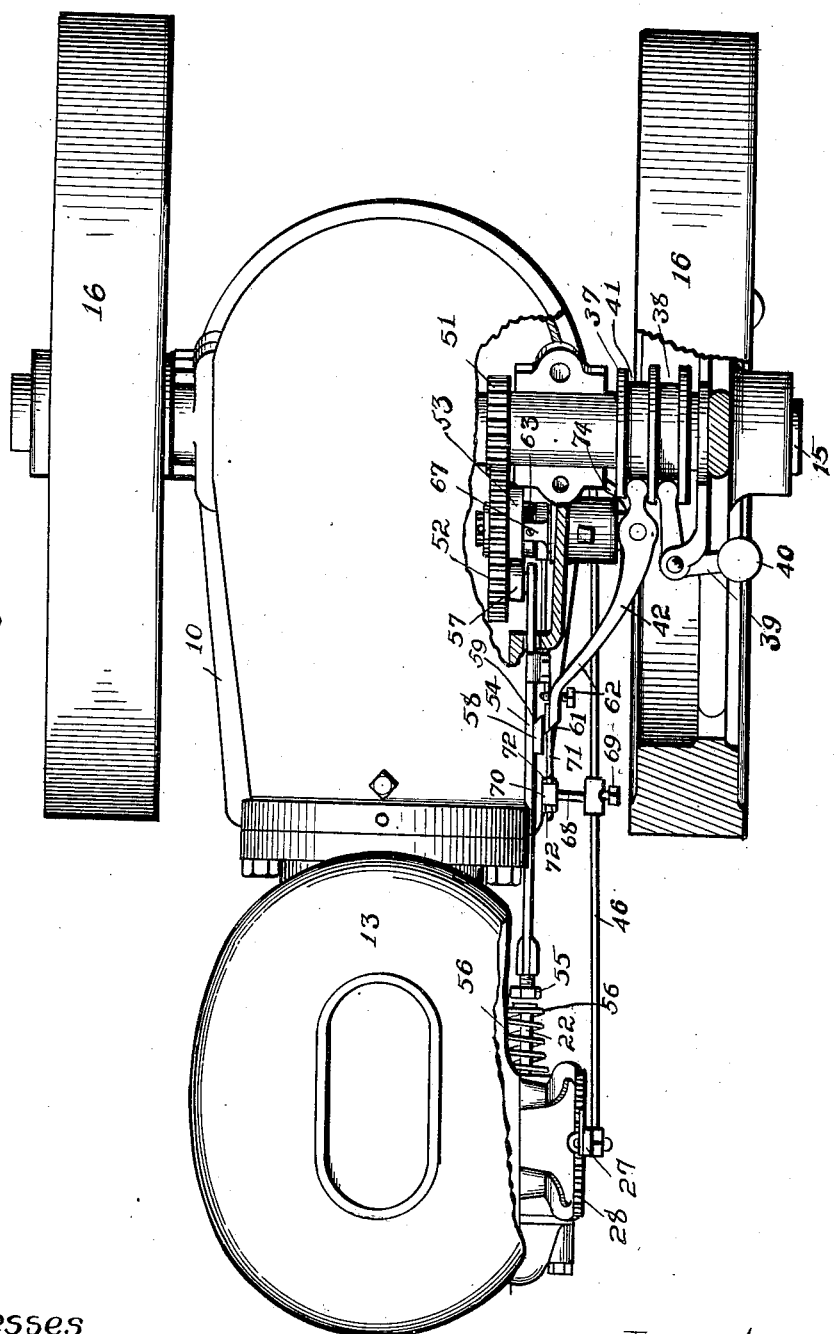

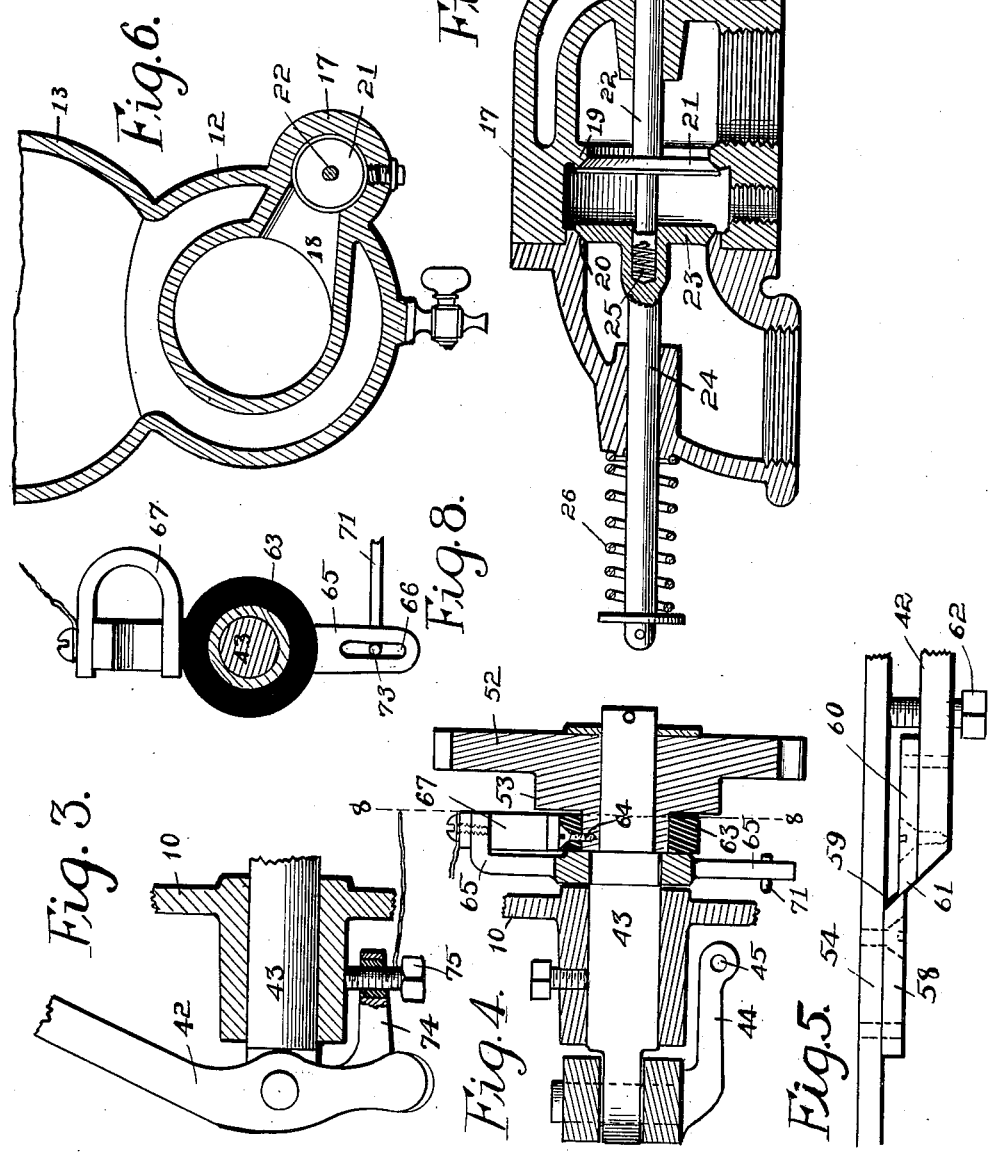

HOWARD B. BURR, OF MASON CITY, IOWA, ASSIGNOR, BY MESNE ASSIGNMENTS, TO CHASE MFG. CO., OF MASON CITY, IOWA, A CORPORATION OF DELAWARE.

INTERNAL-COMBUSTION ENGINE.

1,087,273. Specification of Letters Patent. Patented Feb. 17, 1914.

Application filed January 5, 1911. Serial No. 600,924.

*To all whom it may concern:*

Be it known that I, HOWARD B. BURR, a citizen of the United States, residing at Mason City, in the county of Cerro Gordo and State of Iowa, have invented a certain new and useful Internal-Combustion Engine of which the following is a specification.

The object of my invention is to provide an internal combustion engine of simple, durable and inexpensive construction especially designed for general utility purposes.

A further object is to provide an engine of the class having a speed governor and ignition timer and a fuel regulator with mechanism whereby the speed governor may be set to operate only at high speed, the ignition timer independently set to advance the time of ignition relative to the piston stroke, and the fuel regulator set to position to admit a greater quantity of fuel, or whereby the speed governor will be set to operate at a reduced speed of the engine, the ignition timer will be retarded and the fuel regulator will be set to supply a less amount of fuel so that the engine may be set to develop any desired amount of power and speed and when in any position of its adjustment the fuel supply will be proportioned to the amount of power being developed to effect an economy in the operation of the engine when developing a relatively small amount of power and speed, and to provide an engine that will run steadily at any desired speed.

A further object is to provide an improved valve mechanism for the engine whereby the spring for controlling the exhaust valve may be protected from injury or deterioration on account of the heat developed within the engine and passing around said valve during the exhaust.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of an engine embodying my invention. Fig. 2 shows a top or plan view of same with parts broken away to show certain details of construction. Fig. 3 shows an enlarged, detail, plan view illustrating a portion of the governing lever and the means for making and breaking the electric ignition circuit controlled by said governor lever. Fig. 4 shows an enlarged, detail, sectional view illustrating the countershaft from which the exhaust valve is operated and also illustrating the spark timing device mounted on said shaft, and also the pivotal support for the governor lever. Fig. 5 shows an enlarged, detail, plan view illustrating a portion of the slide bar for operating the exhaust valve, and a portion of the governor arm to coact therewith and to hold the said slide bar in inoperative position. Fig. 6 shows a vertical, transverse, sectional view through the engine cylinder at the intake and exhaust port thereof. Fig. 7 shows an enlarged, detail, sectional view illustrating the engine valves and connected parts, and Fig. 8 shows a sectional view on the line 8—8 of Fig. 4.

Referring to the accompanying drawings, I have used the reference numeral 10 to indicate the engine base having a horizontal engine cylinder 11 mounted thereon surrounded by a water jacket 12 to be supplied from a tank 13; said cylinder is connected to a crank case 14 and the engine shaft 15 extends through the crank case and is provided with the balance wheels 16. The parts just described are of the ordinary construction and the engine illustrated is of the four-cycle horizontal type. At one side of the engine cylinder is a valve casing 17 and a port 18 is provided communicating between the valve chamber and the engine cylinder.

Referring particularly to Fig. 7 of the drawings, it will be seen that the exhaust valve seat 19 and the intake valve seat 20 are in alinement with each other on opposite sides of the port 18. The exhaust valve 21 is mounted on a valve stem 22, which valve stem projects across the port 18 beyond the outer face of the valve. The intake valve 23 is carried by a stem 24 which has a recess at its center adjacent to the valve, which recess also extends through the valve and is designed to receive the projecting end of the stem 22 of the exhaust valve.

In said recess, I have mounted an extensible coil spring 25 and on the outer end of the valve stem 24 is an extensible coil spring 26 designed to yieldingly hold the valve 23 to its seat and to permit said valve to open by suction from within the cylinder. The said spring 25 is arranged so that when both valves are seated the spring is in position slightly spaced apart from the valve stem 22. By the construction just described, I provide for yieldingly holding the intake valve 23 firmly seated when the exhaust valve is open and at the same time the spring 25 does not in any way interfere with the opening movement of the valve 23 occasioned by suction within the cylinder. Further, in this connection engines of this type are operated at times with the exhaust valve held open and in such cases, during certain operations of the piston stroke, there is an intake suction and this tends to open the intake valve. In my improvement it is obvious that, under such circumstances, the spring 25 will be pressed upon by the extension of the valve stem 22 to hold the intake valve firmly to its seat to prevent the loss of fuel which would occur if the intake valve were permitted to open under such circumstances.

Fulcrumed to a suitable stationary support on the engine is an adjusting lever 27 and fixed in position adjacent thereto is a sector 28 having an upper row of figures thereon consecutively arranged and designed to indicate the amount of horse power developed when the lever is adjacent to any of said numbers, said numbers being arranged consecutively from the minimum number of horse power that the engine may develop to the maximum number. In the present instance numbers 1 to 7 are shown. Below this row of numbers is a second row of numbers designed to indicate the speed of the engine when the lever is set adjacent thereto and said numbers are arranged to indicate the number of revolutions of the engine shaft per minute. Fixed to the lower end of the adjusting lever 27 are two laterally extending lugs 29 and 30. Extended through the lug 30 is a screw threaded rod 31 having lock nuts 32 and 33 mounted thereon to engage opposite sides of the lug 30 for adjustably fixing the rod in position relative to the lug. At the other end of the rod 31 I have pivoted a lever 34 connected to a butterfly valve 35 arranged in a carbureter 36 of ordinary construction. The operation of this part of the device is as follows: When the adjusting lever 27 is moved to the left, as shown in Fig. 1, the butterfly valve is moved to position to reduce the size of the passageway through the carbureter and when the lever is moved to the right the valve is moved to position to increase the passageway through the carbureter. The engine governor comprises a sleeve 37 slidingly mounted on the engine shaft and provided with an annular groove 38 in which are inserted the bell crank levers 39 which are mounted on the fly wheel 16. These levers are provided with weights 40 to form an ordinary centrifugal ball governor device for moving the sleeve 37 longitudinally upon its shaft in a direction away from the engine as the speed of the engine shaft increases. A second groove 41 is formed in the sleeve 37 and has inserted in it a governor lever 42, which lever is designed to coact with a slide bar for operating the exhaust valve in the manner commonly employed in internal combustion engines of the hit-and-miss type. This lever 42 is fulcrumed to a short stationary shaft 43 fixed in the engine frame and said lever is provided with an arm 44 having an opening 45 through it as seen in Fig. 4. Extended through this opening 45 is a rod 46. On one end of the rod is an extensible coil spring 47 and a lock nut 48 is mounted on the end of the rod 46 for adjustably holding the spring 47 in engagement with the arm 44 under compression. The other end of the rod 46 is extended through an opening in the lug 29 and is provided with lock nuts 49 and 50 for adjustably fixing it to the lug 29. Said parts are so arranged that the pressure of the spring 47 acts in opposition to the centrifugal action of the governor balls and when the adjusting lever 27 is moved to the left, as shown in Fig. 1, the tension upon the spring 47 is decreased so that the governor lever 42 will be operated to engage with the mechanism for holding the exhaust valve open which will be described hereinafter, when the engine is running at a relatively low speed and when the lever 27 is moved to the right the tension on the spring 47 will be correspondingly increased so that the governor lever 42 will operate on the means for holding the exhaust valve open only after the engine has attained a relatively high speed.

The means for operating the exhaust valve comprises a pinion 51 on the engine shaft 15 and a pinion 52 on the stationary shaft 43. This pinion 52 is provided with a cam 53. Slidingly mounted in suitable supports is an exhaust valve operating bar 54 having an adjustable head 55 at one end to engage the projecting end of the exhaust valve stem 22. Said stem is provided with the usual extensible coil spring 56 for normally holding the exhaust valve closed. Mounted on the bar 54 is a roller 57 normally in engagement with the cam 53. When the engine shaft rotates the cam acts on the roller 57 in such a manner as to reciprocate the bar 54 and said bar holds the exhaust valve open during certain periods of the engine movement. Fixed to the slide bar 54 is a block 58 having a beveled end 59 and fixed to the adjacent end of the governor lever 42 is a block 60 having a correspondingly beveled end 61, said beveled ends being normally in position adjacent to each other. A set screw 62 is seated in the governor lever 42 and is designed to engage the adjacent side of the slide bar 54 to hold the block 60 spaced apart a proper distance from the slide bar 54 so that only the extreme edges of the beveled ends 59 and 61 may engage with each other when the governor lever is in position adjacent to the slide bar and when in said position, and assuming that the slide bar 54 is in its position for holding the exhaust valve open, then the coacting blocks 58 and 60 operate to hold the exhaust valve open until the governor lever 42 is moved away from the slide bar 54. The spark timer and its adjusting means comprise an insulator disk 63 fixed in position on the cam 53 to rotate in unison with the pinion 52. 64 indicates an electric contact point mounted in the disk 63 and electrically connected with the cam 53. Rotatably mounted upon the shaft 43 adjacent to the disk 63 is a lever 65 having a slot 66 at its lower end and an electric contact spring 67 at its upper end, the free end of said spring being designed to engage the periphery of the disk 63 and to engage the contact point 64 during each revolution of the disk 63. This ignition timer is included in the electric circuit used for forming a spark by means of a spark plug in the engine cylinder in the ordinary manner.

My present invention is concerned only with the means for advancing and retarding the spark relative to the speed of the engine and obviously by moving the lever 65 in one direction the spark is advanced and in another direction retarded by the establishment of a circuit through the spring 67 and the contact point 64 to the cam 53 where the current will be grounded upon the engine frame.

In order to provide for adjusting the lever 65 from the adjusting lever 27, I have provided on the rod 46 an arm 68 adjustably secured to the rod 46 by the set screw 69. This arm has a sleeve 70 and extended through this sleeve is a rod 71 provided with nuts 72 thereon on opposite sides of the sleeve for adjustably securing the rod 71 to the sleeve. The other end of the rod 71 is provided with a right-angled extension 73 that extends through the slot 66. The said rod 71 may be bent near its end adjacent to the lever 65 so that it may be moved upwardly or downwardly in the slot 66 to thereby adjust the throw of the lever 65 upon a movement of the rod 71.

The parts for operating the spark timer are so arranged with relation to the rod 46 that when the adjusting lever 27 is moved to the left, as shown in Fig. 1, the time of the spark is retarded and when said lever 27 is moved to the right the spark is advanced.

During the time that the exhaust valve is being held open, it is desirable also to break the electric circuit through the sparking current and for this purpose I have provided on the governor lever 42 an arm 74. In this arm is a set screw 75, insulated from the arm which set screw is included in the spark circuit and is designed to engage an adjacent part of the engine frame when the governor lever 42 is in position out of the path of the slide bar 54. Further when said governor lever is moved to position in the path of the block 58 on the slide bar 54 then the set screw 75 is withdrawn from contact with the engine frame and the sparking circuit is broken until the governor lever again returns to normal position where it will not hold the exhaust valve open. Said set screw 75 further serves the purpose of limiting the movement of the governor lever away from the slide bar 54.

In order that an engine of this type may be adjusted to develop any certain predetermined amount of power within the range of its capacity in an economical manner with the automatic governor controlling the hit-and-miss connection for maintaining the power developed at the predetermined amount regardless of variations in the load being carried by the engine, it is essential that adjusting means be provided for accomplishing three independent functions, to wit: An adjustment of the amount of tension applied to the centrifugal governor, an adjustment of the spark timer and an adjustment of the carbureter. These three adjustments must all bear a certain relation to each other and hence it has been found in practice that a considerable degree of skill and experience is required by an operator in making such adjustments so that they will maintain their proper relations to each other and tend to operate the engine with an economical fuel consumption.

My improved engine is designed for general utility purposes to develop from, for instance, one to eight horse power so that it may be adjusted to position for operating a machine that requires, say, one horse power or a machine that requires, say, seven horse power, or any other amount within the limits of its range, and my engine is especially designed to be used by unskilled persons; and in a machine of this kind it is desirable that the three-fold purpose of adjusting the governor, the spark timer and the carbureter be adjusted from a single lever and that a movement of said lever adjusts all of these three elements with proper relation and it is also desirable that the operator may set the adjusting lever to a certain position so that when the engine is started it will develop the exact predetermined amount of power which the operator believes necessary for performing the work at hand. These various advantages may all be successfully accomplished by the use of my present invention. Another advantage gained by my improved construction is that when the engine is being assembled the rod that connects the adjusting lever to the governor may be properly adjusted relative to the operating lever, the rod that adjusts the carbureter may be properly positioned with relation to the adjusting lever and the rod that operates the spark timer may also be adjusted relative to the rod that controls the governor and all of these parts may be adjusted so that they will bear proper relation to each other and after this adjustment has once been made, the operator need only manipulate the single adjusting lever to control the amount of power being developed by the engine. If however a readjustment of any of these parts, relative to the adjusting lever or to each other, is desired at any time it may be readily and easily accomplished.

Aside from the adjustment of all three of the elements before described at the same time by the use of a single lever, it is advantageous in an engine of this kind to provide a single adjusting means for varying the tension applied to the governor and at the same time positively moving the spark timer to position for advancing or retarding the spark. Heretofore devices have been provided for automatically advancing and retarding the spark by means of an automatic governor. This however will obviously not accomplish the desirable results that are attained by the use of my improved engine for it is essential that in order to accomplish the desired results that both the spark timer and the governor be adjusted separately, and not one by means of the other although this adjustment may be made at the same time with a single lever.

I am aware that, heretofore, internal-combustion engines have been provided with speed governors, spark timers and throttles, but I am not aware that in any instance these three elements have been so arranged and combined that an unskilled operator may accurately and quickly set or adjust all three of these elements to such positions that the engine may be set to produce any predetermined amount of power and speed, so that an engine of the type illustrated herein may be set to produce economically, and at a constant speed, any amount of power from the maximum which the engine is capable of delivering to the minimum of the engine capacity. In order to accomplish this result successfully, there must be a governor for controlling the speed and there must be both a throttle and a spark timer to control the force of explosions, and also to economize fuel. In order that the engine may be made to develop say for instance one horse power, the throttle must be positively set to a predetermined position, the spark timer must be positively set to a predetermined position and the governor must be positively set to a predetermined position, and when the engine is set to develop, say for instance, eight horse power, all of these elements must be set to different positions with relation to each other and the means for controlling the force of explosions independent of the action of the governor. In order to adjust these three elements in proper relative positions for producing a predetermined amount of power and speed, a high degree of skill and a considerable amount of experiment is required. The average unskilled operator of an engine of this class would find it practically impossible to set the engine to develop a predetermined amount of power and speed, unless the engine is provided with visible indicating means for setting all of said elements in proper relative positions.

In the accompanying claims, I have used the term, visible indicating means for setting the adjusting means, to include a marked quadrant and a lever or the equivalents thereof, and I have used the term means for adjusting the governor or the throttle or the spark timer to include the rods or their equivalents by which said elements are adjusted. It is obvious that it is desirable to have all of these adjusting rods connected to a single visible indicating means for setting them, although it is not essential that a single visible indicating means for setting the rods be employed, and I do not desire to be understood as limiting my invention to the employment of a single lever, and marked quadrant.

I claim as my invention:

1. In an internal combustion engine, the combination of a means for controlling the force of explosions, said means comprising a throttle and a spark timer, a means for controlling the speed of the engine, said means comprising a governor whose action is not dependent on the throttle and spark timer, and visible indicating means for adjusting both the means for controlling the force of explosions and the means for controlling the speed of the engine in proper relationship to each other to develop the predetermined amount of power and speed.

2. In an internal combustion engine, the combination of hit and miss mechanism, means for regulating the force of explosions, said means including a throttle and a spark timer, means for regulating the speed of the engine comprising a governor for controlling the hit and miss mechanism, and visible indicating means for adjusting the throttle, the spark timer and the governor, in proper relationship to each other, to develop a predetermined amount of power and speed.

3. In an internal combustion engine, the combination of hit and miss mechanism, a speed governor for controlling the hit and miss mechanism, means for adjusting it, a spark timer, means for adjusting it, and visible indicating means operatively connected with all of said adjusting means in proper relationship to each other to develop a certain predetermined amount of power and speed.

4. In an internal combustion engine, the combination of hit and miss mechanism, a speed governor for controlling the hit and miss mechanism, means for adjusting it, a throttle, means for adjusting it, a spark timer, means for adjusting it, and a single lever operatively connected with all of said adjusting means whereby the governor, the throttle and the spark timer may be adjusted to position for developing a certain predetermined amount of power and speed.

5. In an internal combustion engine of the hit-and-miss electric ignition type, the combination of a centrifugal governor for controlling the hit-and-miss mechanism, a spring arranged to act in opposition to the centrifugal action of the governor, a spark timer for the electric ignition, a carbureter, a valve for controlling the carbureter, means for connecting the adjusting lever and valve, an adjusting element in said means, for varying the position of the carbureter valve relative to the lever, means for connecting said lever to the spring of the governor for varying the tension of the spring when the lever is moved to different positions, said connecting means between the lever and the spring being provided with an adjusting element for varying the tension of the spring relative to the position of the lever, means for operatively connecting the lever to the spark timer, there being an adjustable element in said last named connecting means for changing the position of the spark timer relative to the position of the lever.

6. The combination with an internal combustion engine, of the electric ignition type and having charge supplying means for its combustion chamber, a speed governor, and movable means for intermittently effecting an electric circuit through the igniting mechanism, of a movable adjustable element, means for varying the amount of charges for said combustion chamber, said means being operatively connected to said movable adjustable element, a lever, one end of which is connected to the moving parts of said speed governor and actuated by said governor to occasionally engage and lock the means for introducing a circuit through the igniter so as to cause said means to break the circuit, yieldable resilient means engaging the other end of said lever and adapted to oppose the outward throw of said governor under the action of centrifugal force, means for varying the tension of said yieldable resilient means, such tension varying means being operatively connected to said movable adjustable element.

7. The combination with an internal combustion engine of the electric ignition type and having charge supplying means for its combustion chamber, a speed governor, and movable means for intermittently effecting an electric circuit through the igniting mechanism, of a movable adjustable element, a lever, one end of which is connected to the moving parts of said speed governor and actuated by said governor to occasionally engage and lock the means for introducing a circuit through the igniter so as to cause such means to break the circuit, yieldable resilient means engaging the other end of said lever and adapted to oppose the outward throw of said governor under the action of centrifugal force, means for varying the tension of said yieldable resilient means, and such tension varying means being operatively connected to said movable adjustable element.

8. In an internal combustion engine of the hit-and-miss electric ignition type, the combination of a centrifugal governor for controlling the hit-and-miss mechanism, said centrifugal governor including a spring acting in opposition to the centrifugal action of the governor, a spark timer for the electric ignition device, a single adjusting means operatively connected with the spring of the centrifugal governor and with the spark timer for jointly changing the tension of said spring and the position of the spark timer, and means automatically actuated by the governor for breaking the ignition circuit when said governor is at a certain position of its movement, for the purposes stated.

9. In an internal combustion engine of the hit-and-miss electric ignition type, the combination of a centrifugal governor for the hit-and-miss mechanism, a spring arranged in opposition to the centrifugal action of the governor, said parts being so arranged that when an increased tension is applied to the spring the hit-and-miss mechanism will be actuated to prevent an explosion when the engine is running at relatively high speed and when the tension on the spring is decreased the hit-and-miss mechanism will be actuated to prevent an explosion when the engine is running at relatively low speed, a spark timer for the electric ignition device independent of the governor, a carbureter, a valve for the carbureter, a single adjusting means operatively connected with said spring, said spark timer and said valve designed, when moved in one direction, to increase the tension on the spring, advance the spark and open the valve, and when moved in the opposite direction to decrease the tension on the spring, retard the spark and move the valve toward its closed position, and means automatically actuated by the governor for breaking the ignition circuit when said governor is at a certain position of its movement, for the purposes stated.

Des Moines, Iowa, January 2, 1911.

HOWARD B. BURR.

Witnesses:
M. WALLACE,
M. PETERSON.

Copies of this patent may be obtained for five cents each, by addressing the "Commissioner of Patents, Washington, D. C."